United States Patent [19]

Itoh

[11] Patent Number: 5,557,458
[45] Date of Patent: Sep. 17, 1996

[54] REAL IMAGE FINDER OPTICAL SYSTEM

[75] Inventor: Kazumi Itoh, Mitaka, Japan

[73] Assignee: Olympus Optical Co., Ltd., Tokyo, Japan

[21] Appl. No.: 253,702

[22] Filed: Jun. 3, 1994

[30] Foreign Application Priority Data

Jun. 4, 1993 [JP] Japan .................................... 5-134239

[51] Int. Cl.⁶ ............................. G02B 23/00; G03B 13/02
[52] U.S. Cl. ....................... 359/434; 359/423; 359/431; 354/219; 354/222
[58] Field of Search ..................................... 359/362, 836, 359/423, 434–435; 354/155, 166, 199, 219–224

[56] References Cited

U.S. PATENT DOCUMENTS

| | | | |
|---|---|---|---|
| 3,819,255 | 6/1974 | Matui | 354/225 |
| 4,047,222 | 9/1977 | Moskovich et al. | 354/225 |
| 5,194,886 | 3/1993 | Mukai | 354/222 |

FOREIGN PATENT DOCUMENTS

| | | |
|---|---|---|
| 47-33634 | 11/1972 | Japan . |
| 48-31940 | 4/1973 | Japan . |
| 381749 | 4/1991 | Japan . |

*Primary Examiner*—Thong Nguyen
*Attorney, Agent, or Firm*—Cushman Darby & Cushman, L.L.P.

[57] ABSTRACT

A real image mode finder optical system includes an objective lens, a relay lens, and an eyepiece. A plurality of reflecting surfaces is arranged between the objective lens and the eyepiece. At least one of the reflecting surfaces is movable for deflecting an optical axis, and thereby an optical component disposed behind this reflecting surface is moved in accordance with the deflected optical axis. Thus, a variable angle is provided in a wide range from an eye level to a waist level.

10 Claims, 8 Drawing Sheets

REAL IMAGE FINDER OPTICAL SYSTEM

BACKGROUND OF THE INVENTION

1. Field of the Invention

This invention relates to a real image mode finder optical system and, in particular, to a real image mode finder optical system used in cameras such as camcorders and still cameras.

2. Description of the Related Art

A real image mode finder optical system of prior art, which allows the angle adjustment of an eyepiece section, is set forth, for example, in Japanese Patent Preliminary Publication No. Hei 3-81749 as shown in FIG. 1. This is a Keplerian real image mode finder optical system of the primary imaging type, in which a prism 4 with a roof surface 3 is disposed between an objective lens 1 and a field lens 2. A mirror 6 which can be rotated about a rotating axis 5 is situated downward behind the prism 4. An eyepiece 8 is movably disposed to have an optical axis 7a or 7b in accordance with a change in direction of a ray, which has been incident on the objective lens 1 to travel in a path coinciding with the optical axis 7c of the objective lens 1, by the mirror 6.

A beam of light incident on the objective lens is introduced in the prism 4. The light beam, after being totally reflected by a surface for reflecting light 9 (hereinafter referred to as a reflecting surface) in the prism 4, is reflected further by the roof surface 3 and emerges downward from the prism 4. In the vicinity of the exit surface of the prism 4, an external image, not shown, is formed, and the field lens 2 disposed adjacent to this primary imaging plane leads the light beam to the rotatable mirror 6. When the mirror 6 is placed at the position indicated by solid lines in FIG. 1, the light beam represented by the ray reflected from the mirror 6 to travel in the path coinciding with the optical axis 7a is nearly parallel to the optical axis 7c of the objective lens 1 and is introduced to the eyepiece 8 to form an exit pupil 10a behind it. As indicated by arrows in FIG. 1, the rotatable mirror 6 is turned to the position indicated by broken lines, and the eyepiece 8 is moved to the position also indicated by broken lines to have the optical axis 7b according as the direction of the light beam is changed by the mirror 6. As a result, the light beam incident on the mirror 6 is reflected and introduced to the eyepiece 8 deviated obliquely upward to form an exit pupil 10b behind it.

An observer, when adjusting the pupil of his eye to the exit pupil, can observe the external image. Further, by adjusting the mirror 6 and the eyepiece 8, he can change the optical axis of the eyepiece continuously from one horizontally directed to another obliquely directed upward (and such a change is hereinafter referred to as a variable angle).

In the conventional real image mode finder optical system of the primary imaging type, however, the relationship between the focal length of the objective lens and the field angle makes it impossible to provide the variable angle ranging from the horizontal direction to the vertical direction, namely from an eye level to a waist level, with a proper field angle maintained.

The reason for this is explained below. The variable angle needs a plurality of reflecting surfaces between the lenses as illustrated by the prior art. In order to enable the variable angle over a wide range in particular, it is necessary to provide sufficient space between the lenses in view of the case where any of these reflecting surfaces is rotated. Consequently, the focal length of the objective lens must be increased. This causes the increase of the image height of the primary imaging plane, and thus indicates the necessity of enlarging the prism 4, followed by the field lens 2, the mirror 6, and the eyepiece 8. With such an arrangement, however, not only is the weight of the camera increased, but also part of the light beam is eclipsed by this large-sized optical system in accordance with the change in the observation angle. As a result, the range of the variable angle will not be extended if, on the other hand, the field lens 2 and the eyepiece 8 are made smaller in size, they can receive only a limited portion of a light beam of a large field angle will and the external image of a proper field angle will not be obtained. In other words, if the focal length of the objective lens is increased without enlargement of the field lens or the like, the field angle of an image which is necessarily obtained will be limited to a smaller one.

As mentioned above, the conventional real image mode finder optical system of the primary imaging type cannot provide the variable angle ranging from the eye level to the waist level with a proper field angle maintained, and thus is restricted in an observer's posture of observation and the like. Although Japanese Patent Preliminary Publication Nos. Sho 47-33634 and Sho 48-31940 disclose real image mode finder optical systems, each of which has the variable angle ranging from 0° to 90°, they do not in any way teach arrangements for securing a wide field angle. Also, the application of an electronic finder using an LCD (liquid crystal display panel) is unfavorable because it is higher in cost than an optical finder.

SUMMARY OF THE INVENTION

It is, therefore, an object of the present invention to provide a real image mode finder optical system which allows a variable angle in a wide range, notably from the eye level to the waist level, with a proper field angle maintained.

In order to achieve this object, the real image mode finder optical system according to the present invention includes, at least, an objective lens, a relay lens, an eyepiece, and a plurality of reflecting surfaces arranged between the objective lens and the eyepiece. This arrangement is made so that at least one of the reflecting surfaces can be moved to change the direction of reflection and a component situated on the reflection side of this movable reflecting surface are moved in accordance with the shift of light beam by the movable reflecting surface.

The present invention is provided with the relay lens, together with the plurality of reflecting surfaces, between the objective lens and the eyepiece. For this reason, the positional relationship of the focal length of the relay lens and individual reflecting surfaces is properly set with an image height small, without increasing the focal length of the objective lens, thereby providing sufficient space for arrangement of the reflecting surfaces, as well as for movement. Hence, it is possible to perform the operation of the variable angle in keeping with a desired field angle, without enlarging the reflecting surfaces, etc.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the explanation of the embodiments, it will be expedient to describe the fundamental arrangements of the real image mode finder optical system according to the present invention.

Figure 2A:
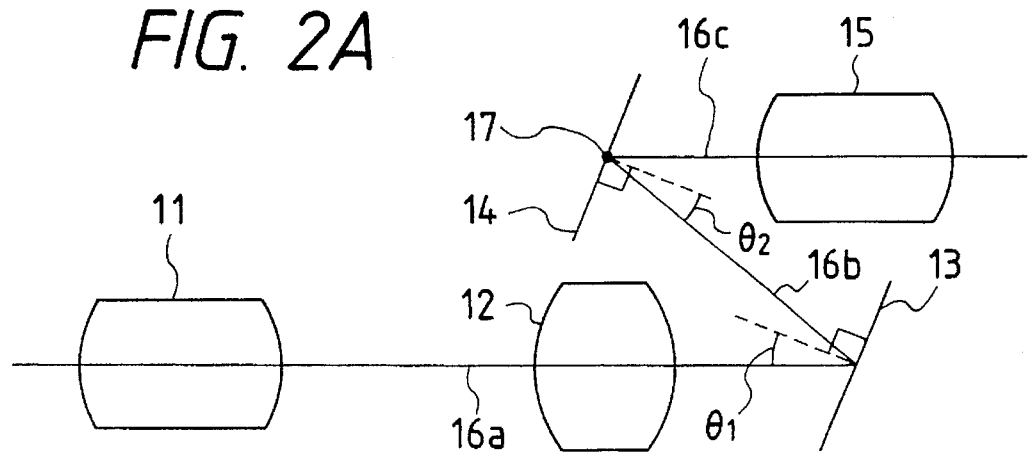
FIGS. 2A and 2B are schematic views showing fundamental arrangements in the states of an eye level and a waist level, respectively, of a real image mode finder optical system according to the present invention.
Figure 2B:
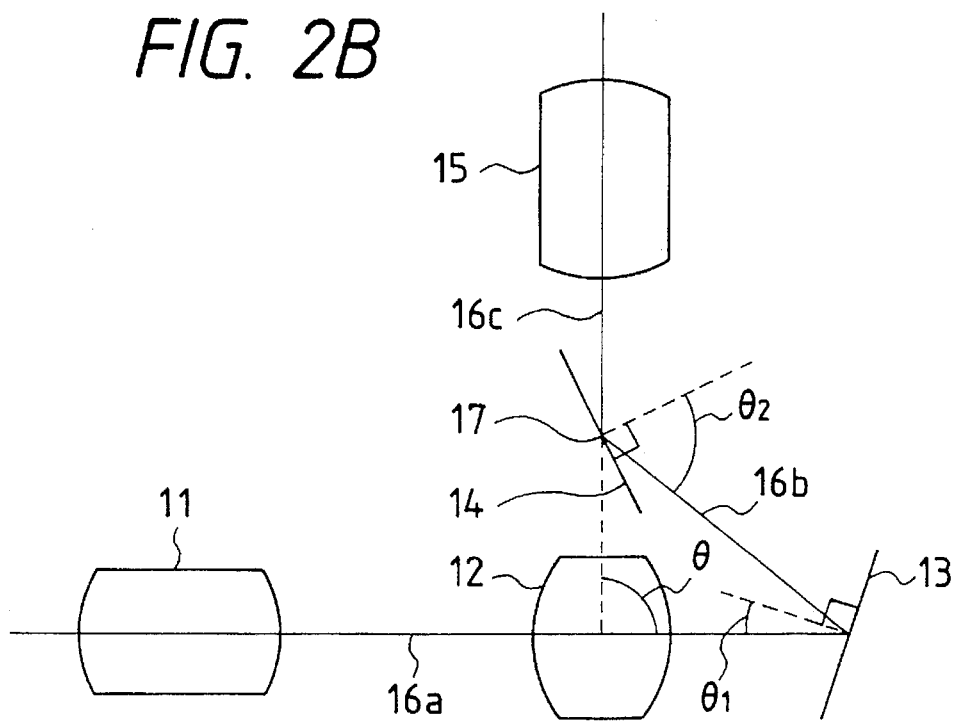

The optical system, as shown in FIGS. 2A and 2B, includes an objective lens 11, a relay lens 12, mirrors 13 and 14, and an eyepiece 15 which are arranged in the order from the object side. At least one of the mirrors 13 and 14 can be shifted, and for simplicity, the mirror 13 is assumed to be fixed. The mirror 14 is disposed perpendicular to a meridional plane including the normal to the mirror 13 at a point of incidence with respect to a ray traveling in a path coinciding with an optical axis 16a and the optical axis 16a (the plane of the figure), and is designed to rotate around a rotating axis 17 which traverses a point of incidence on the mirror 14 with respect to the ray traveling in a path 16b after travelling in the path coinciding with the optical axis 16a and being reflected from the mirror 13 and is normal to the meridional plane. The eyepiece 15 is free to move to change the direction of an optical axis 16c in accordance with the change in direction of light reflected from the mirror 14 and is also designed to rotate around the rotating axis 17 which is the same as in the mirror 14.

As depicted in FIGS. 2A and 2B, when an angle of incidence on the mirror 13 with respect to the ray travelling in the path coinciding with the optical axis 16a is denoted by $\theta_1$, an angle of incidence on the mirror 14 with respect to the ray travelling in the path 16b by $\theta_2$, and an angle made by the optical axis 16c of the eyepiece 15 with the optical axis 16a of the objective lens 11 by $\theta$, $\theta=2(\theta_2-\theta_1)$. In this case, the angle of rotation of the mirror 14 is a half of that of the eyepiece 15.

Incoming light having been incident on the objective lens 11 forms an image in the vicinity of the primary focal plane by the objective lens 11 and is introduced to the relay lens 12. A beam of light represented by the ray travelling in the path coinciding with the optical axis 16a is deflected by the mirrors 13 and 14 and introduced to the eyepiece 15. The image secured by the objective lens 11 is formed as the secondary image by the relay lens 12 and as the exit pupil, not shown, by the eyepiece 15.

Since this arrangement includes the relay lens, it is possible to bring about a sufficient distance from the relay lens to the last lens by increasing the focal length of the relay lens. Hence, even though the focal length of the objective lens is reduced to derive a proper field angle, a plurality of reflecting members can be arranged in a sufficient space.

As mentioned above, the angle $\theta$ made by the optical axis 16a of the objective lens 11 with the optical axis 16c of the eyepiece 15 is determined by the equation, $\theta=2(\theta_2-\theta_1)$. Thus, when observations are made at the eye level, namely $\theta=0°$, the arrangement is as shown in FIG. 2A and $\theta_2=\theta_1$. On the other hand, when observations are made at the waist level, namely $\theta=90°$, the arrangement is as shown in FIG. 2B and $\theta_2=\theta_1+45°$. Further, when the angle $\theta$ is arbitrarily set and the mirror 14 and the eyepiece 15 are rotated so that the equation, $\theta_2=\theta_1+\theta/2$, is satisfied, it is possible to secure the real image mode finder optical system provided with the variable angle which allows a continuous observation, at least, from the eye level to the waist level.

Although in the above arrangements the mirrors 13 and 14 are placed between the relay lens 12 and the eyepiece 15, they may be properly positioned between the objective lens 11 and the eyepiece 15. The number of mirrors is not necessarily limited to two and any number will do, so long as it is a plural. If any of the mirrors can be shifted and an optical component, such as the eyepiece, lying on the reflection side of the shiftable mirror can be moved to deflect the optical axis in accordance with the shift of the mirror, it is possible to obtain the real image mode finder optical system provided with the wide range of variable angle.

As shown in FIGS. 2A and 2B, two mirrors for deflecting the optical path are arranged between the relay lens and the eyepiece so that planes of incidence on their respective reflecting surfaces approximately coincide with each other with respect to the ray that is incident on the objective lens to travel in the path coinciding with the optical axis of the objective lens and at least one reflecting surface can be rotated about a rotating axis perpendicular to this common plane of incident. In this case, the operation of the optical system is facilitated. This simplifies a driving means for performing the shift of the shiftable reflecting surface and the movement of the optical component situated on the eyepiece side of this reflecting surface.

In this arrangement, the rotating axis of the mirror 14 is made to practically coincide with that of the eyepiece 15 situated on the exit side of the mirror 14 so as to lie on a straight line which traverses the intersection of the mirror 14 with the path 16b and is perpendicular to the meridional plane of the mirror 14. In this way, the driving means can be simplified since the reflecting surface of the mirror 14 need not be enlarged and the movement of the optical system is made by nearly the same axis.

In order to derive the real image mode finder optical system of compact design, one of the two reflecting surfaces is fixed, and when the angle of incidence on this fixed reflecting surface is represented by $\theta_f$, it is desirable to satisfy the condition $$15° < \theta_f < 30° \quad (1)$$

If the lower limit of Eq. (1) is passed, the angle of incidence $\theta_f$ of the ray in the path 16a on the fixed reflecting surface, which angle equals the angle of incidence of the same ray on the movable reflecting surface at the eye level, becomes small and the size of the reflecting surfaces can be diminished, but the optical path length required for the disposition of the reflecting surfaces will be increased. If, on the other hand, the angle $\theta_f$ is increased beyond the upper limit, the optical path length is somewhat reduced, but the reflecting surfaces must be enlarged.

In separating from the focal plane formed by the relay lens, the height of an off-axis ray increases, and thus the effective diameter of the optical component on the eyepiece side also increases. In order to suppress oversizing of the effective diameter of the optical component on the eyepiece side, it is desirable to satisfy the condition $$d_{re}/f_r < 3 \quad (2)$$

where $f_r$ is the focal length of the relay lens and $d_{re}$ is an optical path length from the most image-side surface, of the relay lens to the most object-side surface, included in optical components, exclusive of reflecting surfaces, disposed on the eyepiece side of the relay lens. If the upper limit of Eq. (2) is exceeded, the effective diameter of the optical component on the eyepiece side will be oversized.

In the present invention, it Is desirable that the objective lens and the relay lens each lave at least one aspherical surface. Such a configuration will suppress aberrations, notably spherical aberration.

Figure 1:
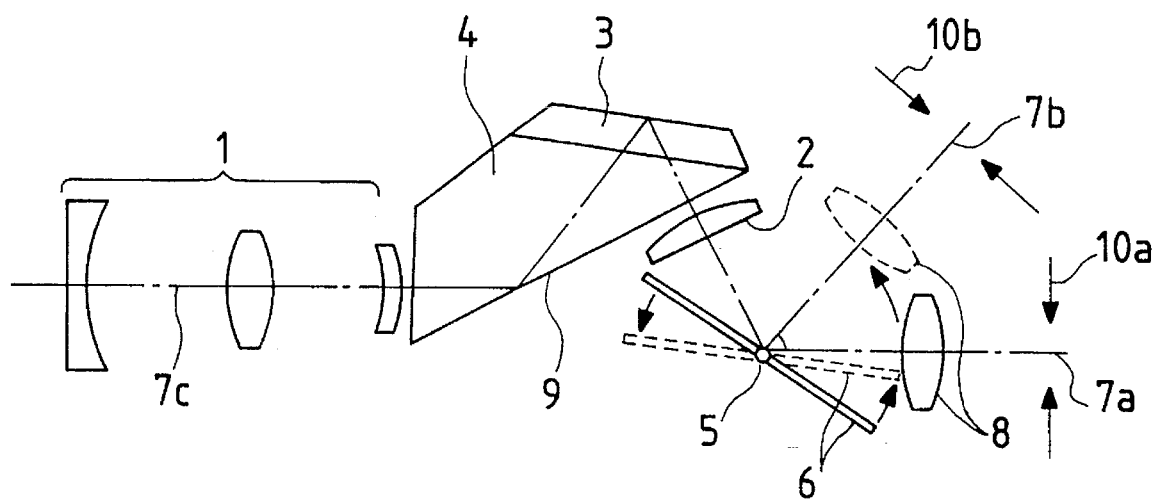
FIG. 1 is a view showing an example of arrangements of real image mode finder optical systems of prior art.
Figure 3:
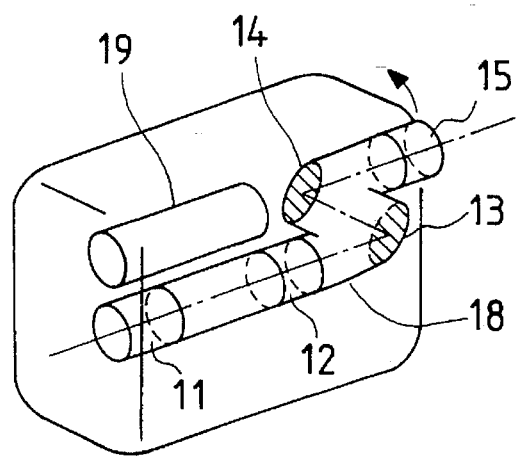
FIG. 3 is a schematic view showing a state where the real image mode finder optical system of the present invention is incorporated in a video camera.

In FIG. 3, openings for a photographing optical system 19 and a finder optical system 18 are arranged nearly perpendicular to the front of the camera body. The finder optical system 18 is such that the objective lens 11 and the relay lens 12 are coaxially arranged in a horizontal direction and the fixed mirror 13 angled behind these components reflects light from the relay lens 12 in an obliquely upward direction. The light is reflected in a horizontal direction by the movable mirror 14 disposed behind the photographing optical system 19 and emerges through the eyepiece 15.

In this way, the arrangement of two reflecting surfaces between the relay lens 12 and the eyepiece 15 makes It possible to dispose the finder optical system 18, independent of the photographing optical system 19. Consequently, it is also possible to compactly design the finder optical system, diminishing parallax with the photographing optical system.

Referring to the drawings, the embodiments of the present Invention will be described in detail below.

Figure 4A:
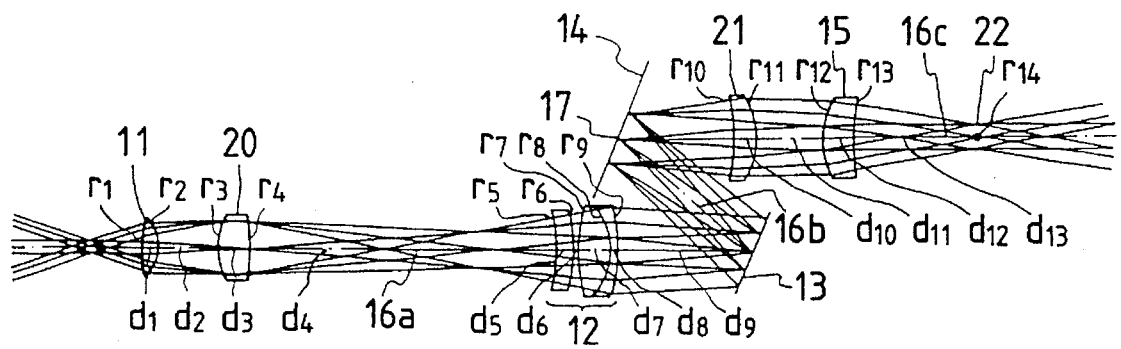
FIGS. 4A, 4B, and 4C are views showing chief optical paths in the states of an eye level, a waist level, and a compromise level, respectively, of a first embodiment of the present invention.
Figure 4B:
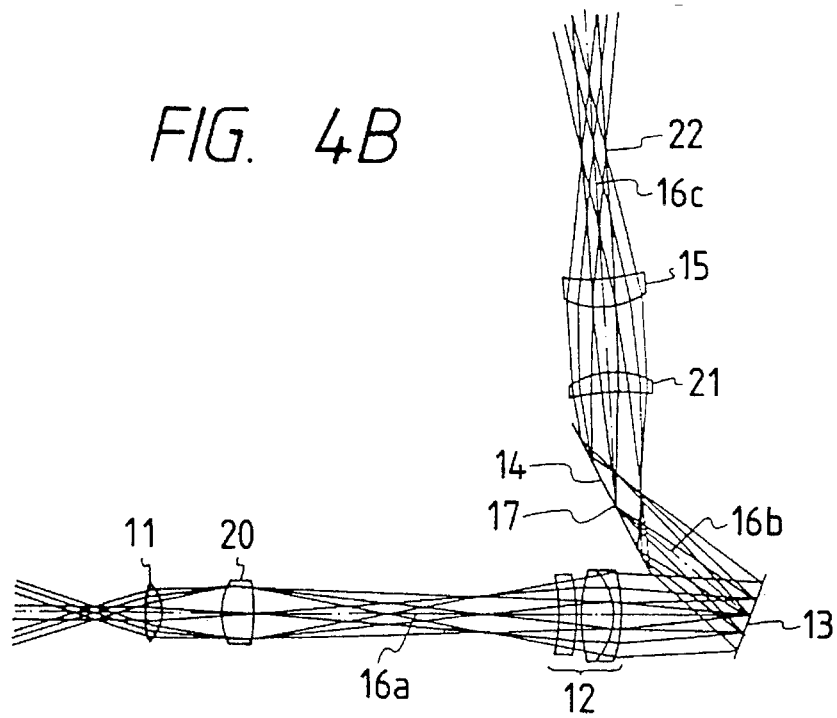
Figure 4C:
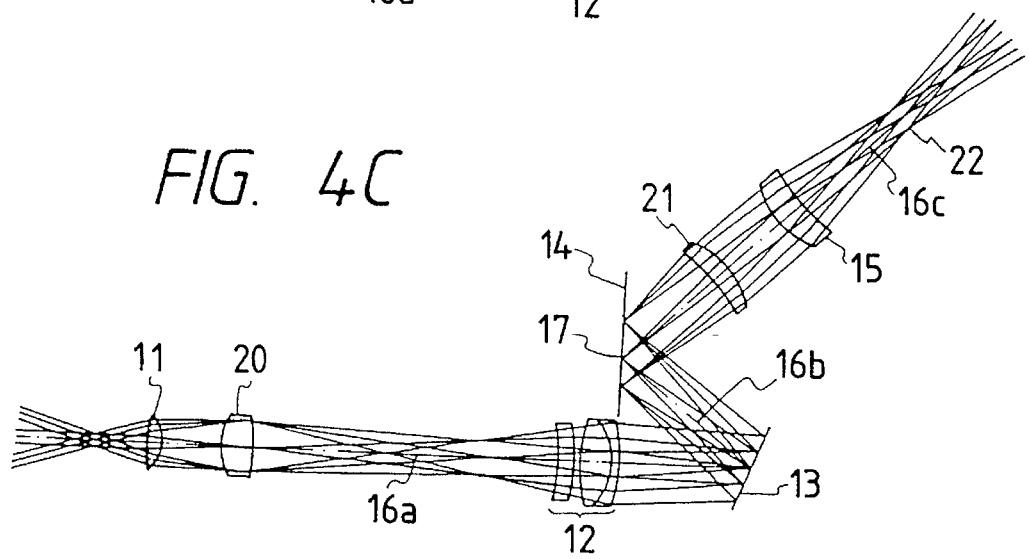

The optical system of the first embodiment shown in FIGS. 4A, 4B, and 4C includes, in the order from the object side, the objective lens 11 with a positive refracting power; a first field lens 20 with a positive refracting power; the relay lens 12 with a positive refracting power; the fixed mirror 13; the movable mirror 14; a second field lens 21 with a positive refracting power; and the eyepiece 15 with a positive refracting power, which are arranged so that a light beam travels therethrough along the 16a (an optical axis of components before the mirrors), 16b, and 16c (an optical axis of components after the mirrors). The mirror 13 is fixed so that the angle $\theta_1$ made by a normal to the reflecting surface thereof at a point of incidence with respect to a ray travelling in a path coinciding with the optical axis 16a with the optical axis 16a is 20°. The mirror 14 is constructed so that the reflecting surface thereof is situated perpendicular to the meridional plane (the plane of the figure) including the normal of the mirror 13 and the optical axis 16a and is rotated about the rotating axis 17 traversing the intersection of the optical axis 16b deflected by the mirror 13 with the reflecting surface of the mirror 14 and crossing perpendicular to the meridional plane. The mirror 14 can be rotated so that the angle $\theta_2$ made by a normal to the mirror 14 at a point of incidence with respect to the ray in the path 16b with the path 16b covers the range of 20–65°. The second field lens 21 and the eyepiece 15 can also be integrally rotated about the rotating axis 17 so that the angle $\theta$ made by the optical axis 16a of the objective lens 11 with the optical axis 16c of the eyepiece 15 ranges from 0° to 90°. The relationship between the angles $\theta$ and $\theta_2$ holds the condition of $\theta_2 = 20° + \theta/2$.

Each of the objective lens 11, the first field lens 20, the second field lens 21, and the eyepiece 15 employs a plastic lens. The objective lens 11 has an aspherical surface, and the relay lens 12 is constructed with, in the order from the object side, an aspherical plastic lens and a cemented glass lens. The field lens 20 is situated adjacent to the first focal plane formed by the objective lens 11, and the field lens 21 is located on the eye side of the second focal plane formed by the objective lens 11, the field lens 20, and the relay lens 12.

The lens data of the first embodiment are listed below. In the data, $r_1, r_2, \ldots$ represent radii of curvature of individual lens surfaces; $d_1, d_2, \ldots$ spaces between individual lens surfaces; $n_{d1}, n_{d2}, \ldots$ refractive indices on the d lines of individual lenses; and $\nu_{d1}, \nu_{d2}, \ldots$ Abbe's numbers of individual lenses. Any of them is shown in the order from the object side. Also, the configuration of each aspherical surface is expressed by the equation $$x = y^2/r\{1 + [1 - P(y/r)^2]^{1/2}\} + A_4 y^4 + A_6 y^6 + A_8 y^8$$

where x represents the coordinates in the direction of the optical axis, y the coordinates in the direction normal to the optical axis, r the paraxial radius of curvature, P the conic constant, and $A_4$, $A_6$, and $A_8$ the aspherical coefficients of fourth, sixth, and eighth orders.

| | | | |
|---|---|---|---|
| $r_1 = 24.6259$ (aspherical) | $d_1 = 2.000$ | $n_{d1} = 1.49241$ | $\nu_{d1} = 57.66$ |
| $r_2 = -8.9357$ | $d_2 = 9.4936$ | | |
| $r_3 = 11.7040$ | $d_3 = 4.3064$ | $n_{d2} = 1.49241$ | $\nu_{d2} = 57.66$ |
| $r_4 = -43.6420$ | $d_4 = 46.0018$ | | |
| $r_5 = -79.1357$ (aspherical) | $d_5 = 3.0129$ | $n_{d3} = 1.49241$ | $\nu_{d3} = 57.66$ |
| $r_6 = -59.7476$ | $d_6 = 1.0152$ | | |
| $r_7 = 38.8013$ | $d_7 = 4.1963$ | $n_{d4} = 1.78590$ | $\nu_{d4} = 44.18$ |
| $r_8 = -10.8582$ | $d_8 = 1.3597$ | $n_{d5} = 1.84666$ | $\nu_{d5} = 23.88$ |
| $r_9 = -35.6486$ | $d_9 = 63.6451$ | | |
| $r_{10} = -39.8188$ | $d_{10} = 2.9995$ | $n_{d6} = 1.49241$ | $\nu_{d6} = 57.66$ |
| $r_{11} = -14.4644$ | $d_{11} = 10.7364$ | | |
| $r_{12} = 16.4360$ | $d_{12} = 4.3186$ | $n_{d7} = 1.49241$ | $\nu_{d7} = 57.66$ |
| $r_{13} = 101.6410$ | $d_{13} = 19.4237$ | | |
| $r_{14} = \infty$ (exit pupil) | | | |

Aspherical coefficients

First surface

P = 1.0000
$A_6 = -0.20454 \times 10^{-4}$
$A_4 = -0.29678 \times 10^{-3}$
$A_8 = 0.17041 \times 10^{-5}$ Fifth surface P = 1.0000
$A_6 = -0.12111 \times 10^{-5}$
$A_4 = 0.13818 \times 10^{-5}$
$A_8 = 0.22331 \times 10^{-7}$ Eq. (1), $\theta_f = 20°$
Eq. (2), $d_{re}/f_r = 2.52$ In the first embodiment, the optical path length $d_{re} = d_9$. Specifically, the optical component adjacently disposed on the image side of the relay lens 12 is the second field lens 21 with the exception of the reflecting surfaces 13 and 14. Hence, the optical path length $d_{re}$ ranges from the surface $r_9$, closest to the image, of the relay lens 12 to the surface $r_{10}$, closest to the object, of the second field lens 21.

A beam of light passing through the apparatus is traced as follows: the light beam incident from the outside on the objective lens 11 is sent rearward by the objective lens 11 and the field lens 20, is imaged on the first focal plane, and is sent further along the optical axis 16a to the relay lens 12; subsequently, the light beam is introduced to the fixed mirror 13 by the relay lens 12, and with an angle of incidence with respect to a ray contained in the beam and travelling in a path coinciding with the optical axis 16a being 20°, is incident on reflected from the mirror 13; the light beam deflected by the mirror 18 is introduced along 16b to the mirror 14, on which the ray contained in the beam and travelling in the path 16b is incident at the angle $\theta_2$; the light beam deflected by the mirror 14 is led along the optical axis 16c to the field lens 21 and the eyepiece 15, behind which the exit pupil 22 is formed. Since the mirror 14 is rotatable, its rotation causes a change in the angle $\theta_2$, thereby allowing the angle $\theta$ made by the optical axis 16a with the optical axis 16c to be continuously changed. In the state of observation at the eye level shown in FIG. 4A, the angle $\theta$ is 0°, while the angle $\theta_1$ is 20°. At the waist level shown in FIG. 4B, the angle $\theta$ is 90°, while the angle $\theta_2$ is 65°. In a compromise state shown in FIG. 4C, the condition of $\theta_2 = 20° + \theta/2$ is fulfilled.

Figure 5A:
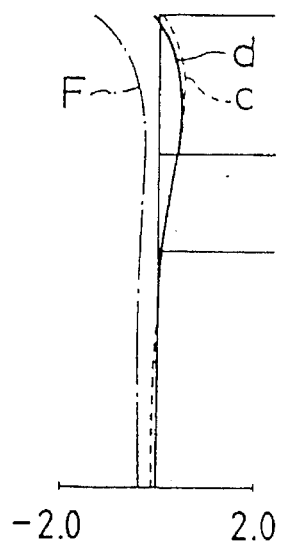
FIGS. 5A, 5B, and 5C are diagrams showing spherical aberration, astigmatism, and distortion, respectively, in the first embodiment.
Figure 5B:
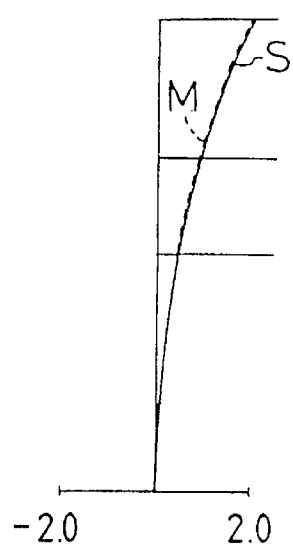
Figure 5C:
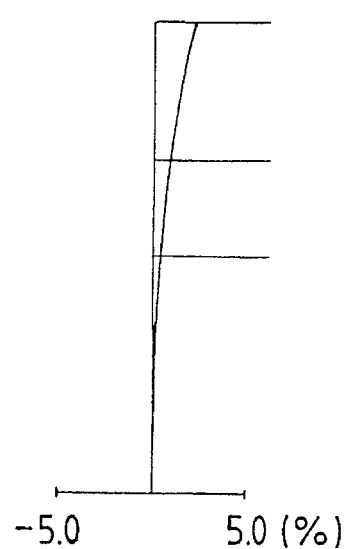

In this way, it is possible to provide the variable angle from the eye level to the waist level with a proper field angle maintained. Also, the aberration diagrams of the first embodiment are as shown in FIGS. 5A, 5B, and 5C, In which symbol $\omega$ denotes a half field angle.

Figure 6:
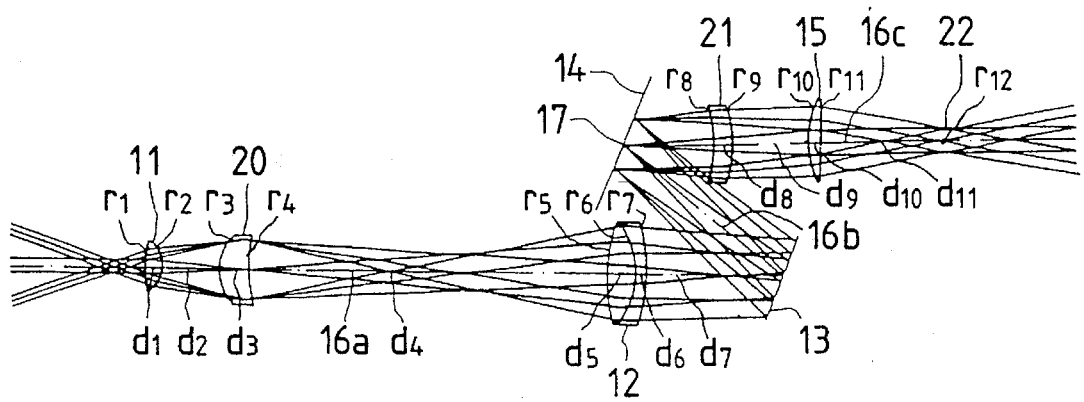
FIG. 6 is a view showing chief optical paths in the state of an eye level in a second embodiment.

FIG. 6 shows the chief optical path of the optical system in the second embodiment. In this figure, like reference numerals are used to the components having like functions with the first embodiment and their explanations are omitted. Only the state of the eye level is shown in the figure and the other states are omitted. In the second embodiment, an aspherical surface is used for the surface lying on the eye side of a cemented lens which constitutes the relay lens 12. The lens data of the second embodiment are shown below.

| $r_1 = 35.8865$ (aspherical) | $d_1 = 2.0000$ | $n_{d1} = 1.49241$ | $v_{d1} = 57.66$ |
|---|---|---|---|
| $r_2 = -9.4502$ | $d_2 = 9.3926$ | | |
| $r_3 = 6.7650$ | $d_3 = 4.2733$ | $n_{d2} = 1.49241$ | $v_{d2} = 57.66$ |
| $r_4 = 20.4194$ | $d_4 = 53.9642$ | | |
| $r_5 = 38.8016$ | $d_5 = 3.9065$ | $n_{d3} = 1.78590$ | $v_{d3} = 44.18$ |
| $r_6 = -10.8577$ | $d_6 = 1.3109$ | $n_{d4} = 1.84666$ | $v_{d4} = 23.88$ |
| $r_7 = -36.4315$ (aspherical) | $d_7 = 64.6192$ | | |
| $r_8 = -27.5324$ | $d_8 = 3.0205$ | $n_{d5} = 1.49241$ | $v_{d5} = 57.66$ |
| $r_9 = -14.8418$ | $d_9 = 10.9056$ | | |
| $r_{10} = 14.8752$ | $d_{10} = 1.6234$ | $n_{d6} = 1.60311$ | $v_{d6} = 60.70$ |
| $r_{11} = 74.1481$ | $d_{11} = 17.9529$ | | |
| $r_{12} = \infty$ (exit pupil) | | | |

Aspherical coefficients

Figure 7A:
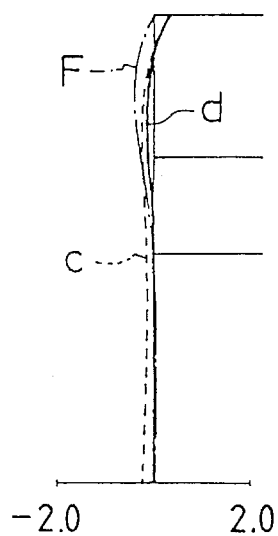
FIGS. 7A, 7B, and 7C are diagrams showing spherical aberration, astigmatism, and distortion, respectively, in the second embodiment.
Figure 7B:
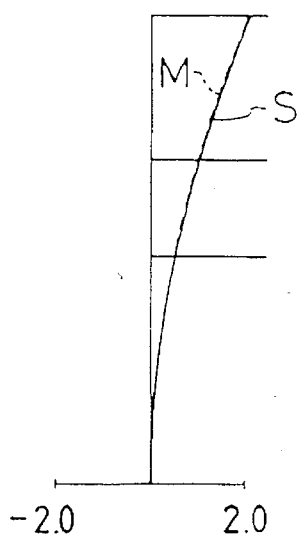
Figure 7C:
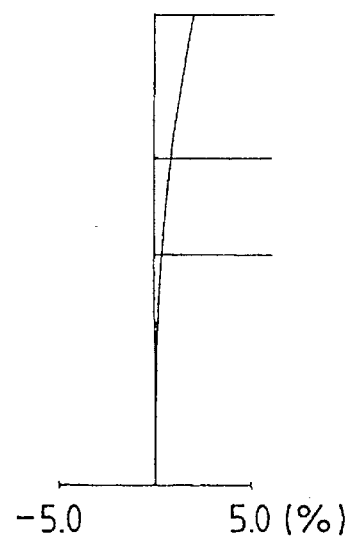

First surface $P = 1.0000$          $A_4 = -0.27506 \times 10^{-3}$
$A_6 = 0.13332 \times 10^{-4}$   $A_8 = 0.46573 \times 10^{-7}$ Seventh surface $P = 1.0000$          $A_4 = 0.47362 \times 10^{-5}$
$A_6 = 0.10638 \times 10^{-7}$   $A_8 = 0.52301 \times 10{-9}$ Eq. (1), $\theta_r = 20°$
Eq. (2), $d_{re}/f_r = 2.38$ In the second embodiment, the use of the aspherical surface for the cemented lens does away with the need for a single aspherical lens used in the first embodiment, thus resulting in reduction of the number of parts. Also, the aberration diagrams of the second embodiment are as shown in FIGS. 7A, 7B, and 7C.

Figure 8:
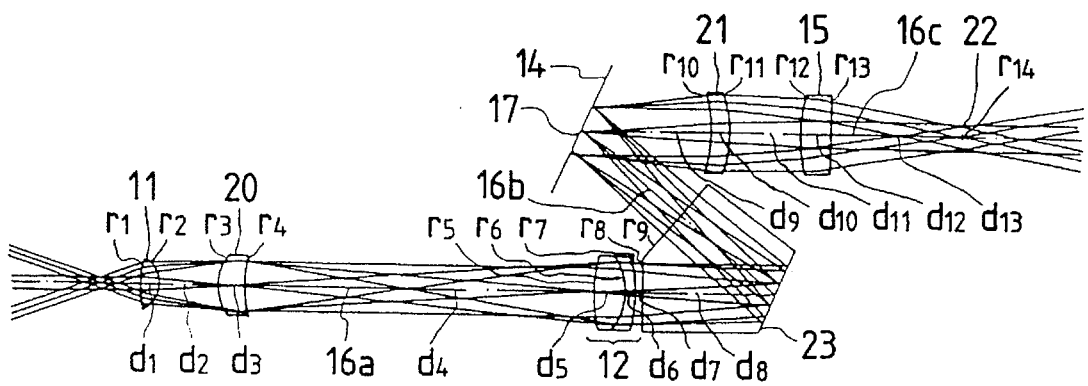
FIG. 8 is a view showing chief optical paths in the state of an eye level in a third embodiment.

FIG. 8 shows the chief optical path of the optical system in the third embodiment. In this figure, like reference numerals are used to the components having like functions with the first embodiment and their explanations are omitted. The third embodiment employs a prism 23 instead of the mirror 13.

The lens data of the third embodiment are shown below.

| $r_1 = 24.7852$ (aspherical) | $d_1 = 2.0000$ | $n_{d1} = 1.49241$ | $v_{d1} = 57.66$ |
|---|---|---|---|
| $r_2 = -8.7808$ | $d_2 = 9.5644$ | | |
| $r_3 = 7.9924$ | $d_3 = 4.3255$ | $n_{d2} = 1.49241$ | $v_{d2} = 57.66$ |
| $r_4 = 31.4555$ | $d_4 = 52.0044$ | | |
| $r_5 = 38.8011$ | $d_5 = 4.1180$ | $n_{d3} = 1.78590$ | $v_{d3} = 44.18$ |
| $r_6 = -10.8596$ | $d_6 = 1.7011$ | $n_{d4} = 1.84666$ | $v_{d4} = 23.88$ |
| $r_7 = -35.6745$ | $d_7 = 0.9906$ | | |
| $r_8 = \infty$ (aspherical) | $d_8 = 38.9986$ | $n_{d5} = 1.49241$ | $v_{d5} = 57.66$ |
| $r_9 = \infty$ | $d_9 = 39.4997$ | | |
| $r_{10} = -50.1465$ | $d_{10} = 2.9904$ | $n_{d6} = 1.49241$ | $v_{d6} = 57.66$ |
| $r_{11} = -13.6757$ | $d_{11} = 10.7207$ | | |
| $r_{12} = 17.0007$ | $d_{12} = 4.4546$ | $n_{d7} = 1.49241$ | $v_{d7} = 57.66$ |
| $r_{13} = 86.0564$ | $d_{13} = 19.3593$ | | |
| $r_{14} = \infty$ (exit pupil) | | | |

Aspherical coefficients

First surface $P = 1.0000$          $A_4 = -0.21177 \times 10^{-3}$
$A_6 = -0.91324 \times 10^{-5}$   $A_8 = 0.11571 \times 10^{-5}$ Eighth surface $P = 1.0000$          $A_4 = -0.15051 \times 10^{-4}$
$A_6 = 0.66766 \times 10^{-6}$   $A_8 = -0.20397 \times 10^{-7}$ Eq. (1), $\theta_f = 20°$
Eq. (2), $d_{re}/f_r = 2.44$ In the third embodiment, the entrance surface of the prism 23 is paraxially flat but aspherical. This aspherical surface has the behavior of correction for aberration of the relay lens and is contained in the relay lens. The optical path length $d_{re}$ in Eq. (2) indicates the distance from the above aspherical surface to the entrance surface of the second field lens 21. Also, since the angle of incidence of the light beam on the reflecting surface situated inside the prism 23 is nearly 20° and does not satisfy the condition of total reflection, a mirror coating is applied to the reflecting surface.

Figures 9A, 9B, 9C:
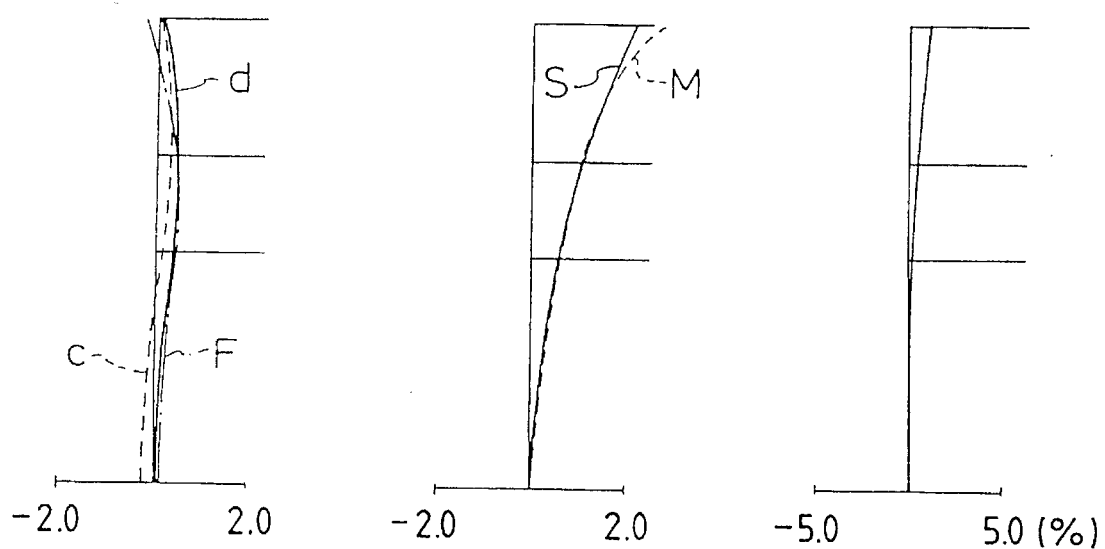
FIGS. 9A, 9B, and 9C are diagrams showing spherical aberration, astigmatism, and distortion, respectively, in the third embodiment.

The use of a readily fabricable plastic prism, which makes it possible to easily provide an aspherical surface, dispenses with the need for applying the aspherical surface to the relay lens. Consequently, it is not necessary to use the aspherical surface for the relay lens as in the first embodiment and to shape glass into an aspherical form as in the second embodiment. Also, the aberration diagrams of the third embodiment are as shown In FIGS. 9A, 9B, and 9C.

Figure 10A:
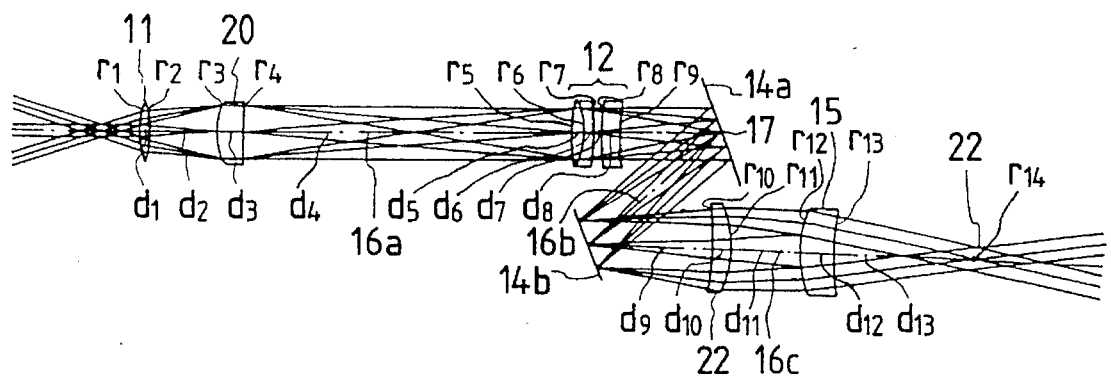
FIGS. 10A, 10B, and 10C are views showing chief optical paths in the states of an eye level, a waist level, and a compromise level, respectively, of a fourth embodiment.
Figure 10B:
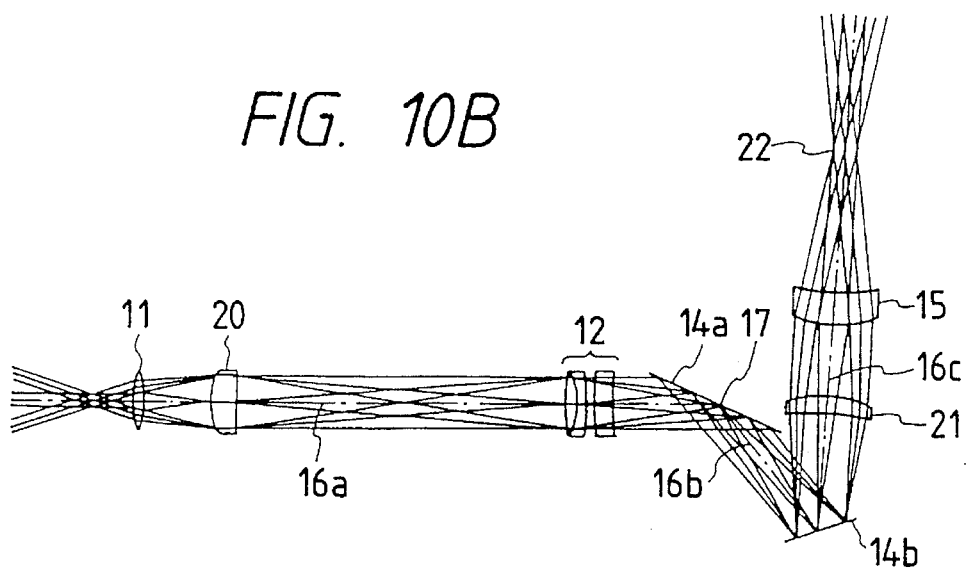
Figure 10C:
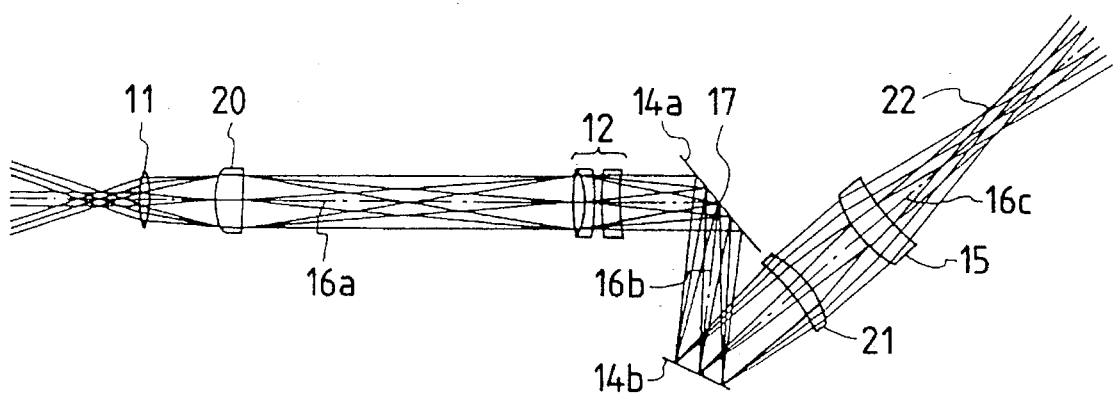

The optical system of the fourth embodiment shown in FIGS. 10A, 10B, and 10C includes, In the order from the object side, the objective lens 11 with a positive refracting power; the first field lens 20 with a positive refracting power; the relay lens 12 with a positive refracting power; a mirror 14a having a reflecting surface, rotated about the rotating axis 17; a mirror 14b rotated about the rotating axis 17 which is the same as in the mirror 14a; the second field lens 21 with a positive refracting power; and the eyepiece 15 with a positive refracting power, which are arranged so that a light beam travels therethrough along 16a (an optical axis of components before the mirrors), 16b, and 16c (an optical axis of components after the mirrors). The mirror 14a can be rotated about the rotating axis 17 traversing the intersection of the optical axis 16a with the reflecting surface of the mirror 14a and crossing perpendicular to the meridional plane (the plane of the figure) including a normal to the mirror 14a at a point of incidence with respect to a ray travelling in a path coinciding with the optical axis 16a and the optical axis 16a so that the angle $\theta_2$ made by the normal to the reflecting surface of the mirror 14a with the optical axis 16a is variable. The mirror 14a can be rotated so that the angle $\theta_2$ covers the range of 20°–65°. The mirror 14b is disposed perpendicular to the meridional plane and is rotated about the rotating axis which is the same as in the mirror 14a. The angle made by a normal to the mirror 14b at a point of incidence with respect to the ray in the path 16b with the path axis 16b is always set at 20°. The second field lens 21 and the eyepiece 15 can also be rotated, integral with the mirror 14b, about the rotating axis 17 so that the angle $\theta$ made by the optical axis 16a of the objective lens 11 with the optical axis 16c of the eyepiece 15 ranges from 0° to 90°. The relationship between the angles $\theta$ and $\theta_2$ holds the condition of $\theta_2 = 20° + \theta/2$.

The relay lens 12 has a cemented glass lens on the object side and an aspherical plastic lens on the eye side. The objective lens 11 also has an aspherical surface. The lens data of the fourth embodiment are listed below.

| | | | |
|---|---|---|---|
| $r_1 = 27.4016$ (aspherical) | $d_1 = 2.0000$ | $n_{d1} = 1.49241$ | $v_{d1} = 57.66$ |
| $r_2 = -8.8134$ | $d_2 = 9.5036$ | | |
| $r_3 = 10.2843$ | $d_3 = 4.3108$ | $n_{d2} = 1.49241$ | $v_{d2} = 57.66$ |
| $r_4 = -78.9221$ | $d_4 = 49.3125$ | | |
| $r_5 = 38.7422$ | $d_5 = 2.0000$ | $n_{d3} = 1.78590$ | $v_{d3} = 44.18$ |
| $r_6 = -10.7392$ | $d_6 = 1.4053$ | $n_{d4} = 1.84666$ | $v_{d4} = 23.88$ |
| $r_7 = -35.6242$ | $d_7 = 0.9979$ | | |
| $r_8 = 59.4039$ (aspherical) | $d_8 = 2.9994$ | $n_{d5} = 1.49241$ | $v_{d5} = 57.66$ |
| $r_9 = 79.8355$ | $d_9 = 60.3531$ | | |
| $r_{10} = -43.6899$ | $d_{10} = 2.9990$ | $n_{d6} = 1.49241$ | $v_{d6} = 57.66$ |
| $r_{11} = -14.2844$ | $d_{11} = 10.7257$ | | |
| $r_{12} = 16.8927$ | $d_{12} = 5.5407$ | $n_{d7} = 1.49241$ | $v_{d7} = 57.66$ |
| $r_{13} = 101.2573$ | $d_{13} = 21.5828$ | | |
| $r_{14} = \infty$ (exit pupil) | | | |

Aspherical coefficients

First surface $P = 1.0000$   $A_4 = -0.35448 \times 10^{-3}$
$A_6 = -0.20522 \times 10^{-6}$   $A_8 = 0.25029 \times 10^{-6}$ Eighth surface $P = 1.0000$   $A_4 = -0.72723 \times 10^{-5}$
$A_6 = -0.10732 \times 10^{-5}$   $A_8 = 0.40039 \times 10^{-7}$ Eq. (1), $\theta_f = 20°$
Eq. (2), $d_{re}/f_r = 2.42$ A beam of light passing through the apparatus is traced as follows: the light beam incident from the outside on the objective lens 11 is sent rearward by the objective lens 11 and the field lens 20, is imaged on the first focal plane formed by the objective lens 11, and Is sent further along the optical axis 16a to the relay lens 12; subsequently, the light beam is introduced to the mirror 14a by the relay lens 12, and with the angle of incidence $\theta_2$, with respect to a ray contained in the beam and travelling in a path coinciding with the optical axis 16a is on and reflected from the mirror 14a; the mirror 14a is rotatable, thereby being capable of changing the angle $\theta_2$; further, the mirror 14b is rotated, integral with the field lens 21 and the eyepiece 15, about the rotating axis 17 in accordance with the deflection of the path 16b; the light beam deflected by the mirror 14a is introduced along the path 16b to the mirror 14b, and after incidence at an angle of incidence with respect to the ray contained in the beam and travelling in the path 16b being 20°, is incident on and reflected from the mirror 14b; the reflected light beam is led to the field lens 21 and the eyepiece 15, behind which the exit pupil 22 is formed. The rotation of the mirror 14a about the rotating axis 17 will cause a change in the angle $\theta_2$, and the mirror 14b, the field lens 21, and the eyepiece 15 are rotated together about the rotating axis 17, in accordance with the deflection of the path 16b, thereby allowing the angle $\theta$ made by the optical axis 16a with the optical axis 16c to be continuously changed. In the state of observation at the eye level shown in FIG. 10A, the angle $\theta$ is 0°, while the angle $\theta_2$ is 20°. At the waist level shown in FIG. 10B, the angle $\theta$ is 90°, while the angle $\theta_2$ is 65°. In a compromise state shown in FIG. 10C, the condition of $\theta_2 = 20° + \theta/2$ is fulfilled.

Figure 11A:
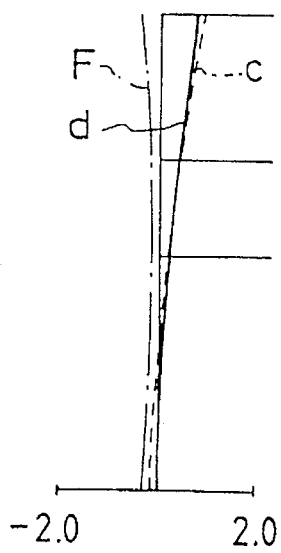
FIGS. 11A, 11B, and 11C are diagrams showing spherical aberration, astigmatism, and distortion, respectively, in the fourth embodiment.
Figure 11B:
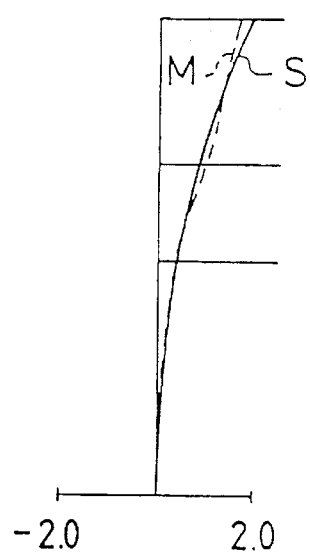
Figure 11C:
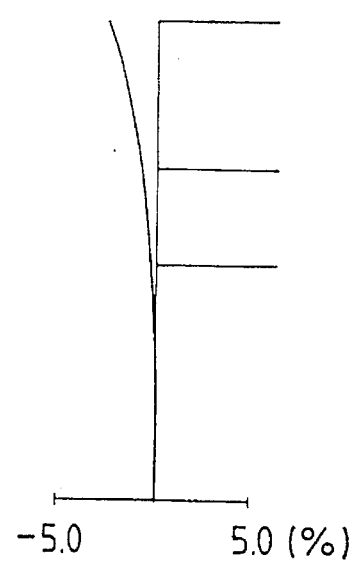

In this way, it is possible to provide the variable angle from the eye level to the waist level with a proper field angle maintained. Also, the aberration diagrams of the fourth embodiment are as shown in FIGS. 11A, 11B, and 11C.

Although the embodiments of the present invention have been described, the range of the variable angle can be extended further by increasing the angles of rotation of the movable mirrors and changing the angles of incidence on both reflecting surfaces. Also, a zoom lens may well be used for the objective lens.

What is claimed is:

1. A real image mode finder optical system comprising:

an objective lens for forming an image of an object;

a relay lens for receiving light from said image formed by said objective lens to form a secondary image;

an eyepiece disposed to receive light from said secondary image for observing said image relayed by said relay lens; and a plurality of reflecting surfaces arranged in an optical path between said objective lens and said eyepiece, at least one of said plurality of reflecting surfaces being movable for changing a direction of light reflected therefrom;

optical components situated on a reflection side of said movable reflecting surface, said optical components being movable to be aligned with a path of an axial ray shifted in accordance with a movement of said movable reflecting surface, said axial ray being defined as a ray incident on said objective lens and travelling in a path coinciding with an optical axis of said objective lens.

2. A real image mode finder optical system according to claim 1, wherein:

a fixed reflecting surface and a movable reflecting surface are arranged between said relay lens and said eyepiece, and satisfy conditions:

$15° < \theta_f < 30°$ $d_{re}/f_r < 3$ where $\theta_f$ is an angle of incidence of said axial ray on said fixed reflecting surface, $d_{re}$ is an optical path length from a most image-side surface of said relay lens to a most object-side surface included in said optical components, exclusive of said plurality of reflecting surfaces, situated on an eyepiece side of said relay lens, and $f_r$ is a focal length of said relay lens.

3. A real image mode finder optical system according to claim 2, wherein:

said fixed reflecting surface and said movable reflecting surface are positioned so that respective normals thereto at respective points of incidence of said axial ray substantially lie in a common plane, said movable reflecting surface being rotated about a rotating axis which traverses said point of incidence of said axial ray on said movable reflecting surface and is perpendicular to said common plane.

4. A real image mode finder optical system according to claim 2, wherein:

at an eye level, one reflecting surface included in said plurality of reflecting surfaces causes said axial ray, emergent from said relay lens, to travel in an obliquely forward direction, and another reflecting surface included in said plurality of reflecting surfaces causes said axial ray, emergent from said one reflecting surface, to travel in a backward direction.

5. A real image mode finder optical system according to claim 1, wherein:

said movable reflecting surface is rotatable about a rotating axis, said rotating axis traversing a point of incidence of said axial ray on said movable reflecting surface and being perpendicular to a plane of incidence of said axial ray on said movable reflecting surface.

6. A real image mode finder optical system according to claims 1 or 5, wherein:

each of said objective lens and said relay lens has an aspherical surface.

7. A real image mode finder optical system according to claims 1 or 5, wherein:

by movements of said movable reflecting surface and said optical components situated on said reflection side thereof, said objective lens and said eyepiece have a positional relationship providing an arbitrary angle, from an eye level at which optical axes of said objective lens and said eyepiece are substantially parallel to each other to a waist level at which said optical axes are substantially perpendicular to each other.

8. A real image mode finder optical system according to claims 1 or 5, further comprising:

a first field lens having a positive refracting power, disposed adjacent to said image formed by said objective lens; and a second field lens having a positive refracting power, disposed on an eye side of said secondary image formed by said relay lens.

9. A real image mode finder optical system according to claim 8, wherein:

said movable reflecting surface is disposed between said relay lens and said second field lens; and said second field lens and said eyepiece are moved with said movable reflecting surface.

10. A real image mode finder optical system according to claim 9, wherein:

another one of said plurality of reflecting surfaces is disposed between said movable reflecting surface and said second field lens.

* * * * *